Aug. 14, 1934.  W. D. EGLINTON  1,970,079
SPECTACLES OR EYEGLASSES
Filed May 28, 1930

Inventor,
William David Eglinton,
by Frank S. Appleman,
attorney.

Patented Aug. 14, 1934

1,970,079

UNITED STATES PATENT OFFICE 1,970,079

SPECTACLES OR EYEGLASSES

William David Eglinton, Croydon, England

Application May 28, 1930, Serial No. 456,715
In Great Britain October 4, 1929

7 Claims. (Cl. 88—44)

The invention relates to spectables or eyeglasses and has reference to folding spectacles or eyeglasses of that character wherein the eyepieces are adapted to be folded about hinges so that one lies upon the other.

A disability from which such spectacles as hitherto constructed suffer is that when in use the one lens or eyepiece is located in a plane slightly in advance of the other. Thus unless special correction of the lenses is effected the vision through the glasses is slightly impaired.

The object of the present invention is to remedy this defect and the invention consists broadly in the provision of folding spectables or eyeglasses wherein the hinges between the eyepieces and the bridge or nosepiece are so constructed or disposed that the eyepieces can be folded to lie one upon the other but when opened out for use the eyepieces will lie in alignment in the same plane. This is effected according to my invention by setting the lugs or ears of the hinges at an angle such that the folding operation automatically carries the one eyepiece out of the plane of the other. The members which are rigid with the frames of the eyepieces and which have pintles or pivots of a bridge may be known as lugs, knuckles are ears and in the further reference to these elements, they will be designated as lugs.

An embodiment of the invention is illustrated in the accompanying drawing wherein like numerals of reference indicate corresponding parts wherever occurring.

Figure 1:
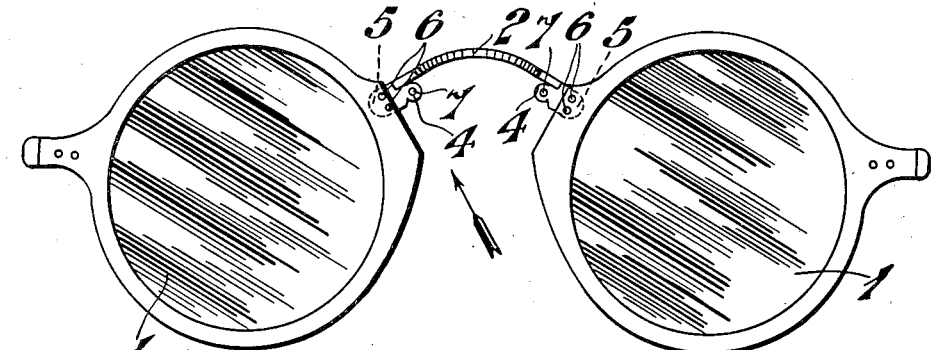
Figure 2:
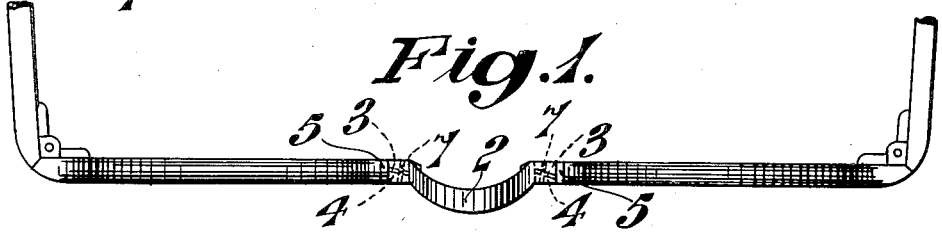
Figure 3:
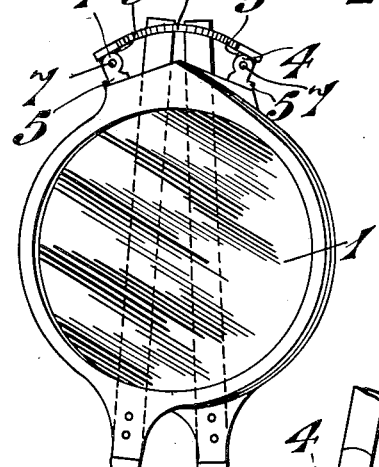
Figure 4:
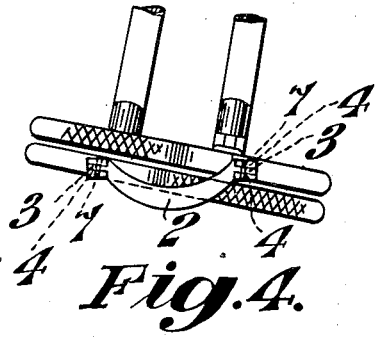
Figure 5:
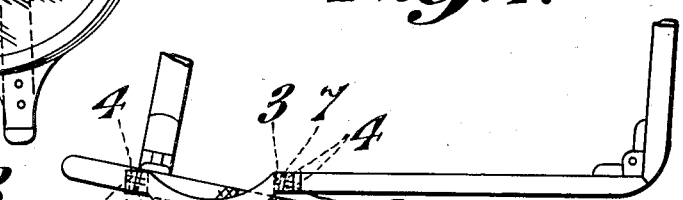
Figure 6:
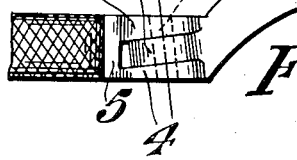

In the drawing Figure 1 is a front elevation of a pair of spectacles according to the invention and shown in the open position, Figure 2 is a plan or edge view thereof, Figure 3 is an elevation of the spectacles shown in Figure 1 with the eyepieces in the completely folded up position, Figure 4 is a plan or edge view of Figure 3, Figure 5 is a plan or edge view of the spectacles shown in Figure 1 when only partially folded up and Figure 6 is an enlarged underside view, looking in the direction of the arrow in Figure 1, of one of the hinges by which the eyepieces are connected to the nosepieces or bridge of the spectacles.

Referring to the drawing the numeral 1 designates the eyepieces the frames of which are preferably of tortoiseshell, or like material but may be of metal. The numeral 2 designates the metal bridge or nosepiece and in the construction shown one lug 3 of each of the hinges is formed integral with this bridge or nosepiece 2. The other lugs 4 of the hinge are formed upon a hinge member 5 secured to the spectacle frame by rivets 6. The lugs 3 and 4 interengage and are hingedly coupled by the pivot pin 7. The lugs of the hinges and the pivot pins are arranged at angles to the eyepieces, as shown, so that when the eyepieces are folded about the pivot pins 7 the folding operation automatically carries the one eyepiece out of the parallel plane and out of alignment with the other, as will be seen on reference to Figure 5, and when completely folded up the two eyepieces lie one behind the other as shown in Figures 3 and 4.

It will be understood that the precise angle of the lugs of the hinges depends upon the thickness of the eyepiece frames the arrangement being essentially such that when folding up the spectacles the angles cause the eyepieces to recede from each other by a distance at least equal to the thickness of the material employed for the eyepiece frames so that when completely folded up the two eyepieces finally rest in close juxtaposition as shown in Figure 4.

It will be understood that the legs of the spectacle may be hinged intermediate their length in accordance with known practice.

It will be seen that the method of construction hereinbefore described, allows the two eyepieces to stand in perfect alignment to each other when open and in use.

What I claim and desire to secure by Letters Patent is:—

1. Folding spectacles or eyeglasses comprising a rigid bridge, eye-pieces hinged to said bridge for relative movement one to the other and lying in alignment one with the other in operative position, hinge pins lying in a horizontal plane disposed at angles to the plane of the aligned eye pieces such that said eye pieces can be turned edgewise towards each other in the folding up operation to cause the eye pieces to swing out of the plane of alignment and pass each other to lie one behind the other in the folded up position.

2. Folding spectacles or eyeglasses comprising a rigid bridge, eye pieces hinged to said bridge and lying in alignment one with the other in the open position, hinge lugs attached to the bridge and lying in the same plane as the eye pieces but disposed at an angle to the plane of the aligned eye pieces, cooperating hinge lugs attached to the eye pieces and horizontally disposed hinge pins connecting the cooperating lugs and disposed at right angles to the angles of the lugs.

3. Folding spectacles or eyeglasses comprising a rigid bridge, eye pieces having lugs at angles thereto, pivots supported by the lugs on which the bridge is hinged whereby said bridge and eye pieces lie in alignment one with the other in operative position, stops to limit the opening movement of the eye pieces relative to the bridge, said pivots being disposed in a horizontal plane at angles to the plane of the aligned eye pieces about which pivots said eye pieces can turn edgewise towards each other, whereby in the folding up operation the eye pieces swing towards each other out of the plane of alignment and pass each other without collision to lie one behind the other in the folded up position.

4. Folding spectacles or eyeglasses comprising a rigid bridge, eye pieces hinged to said bridge and lying in alignment one with the other in the open position, stops to limit the opening movement of the eye pieces relative to the bridge, hinge lugs attached to the bridge disposed at an angle to the plane of the aligned eye pieces, cooperating hinge lugs attached to the eye pieces and horizontally disposed hinge pins connecting the cooperating lugs and disposed at right angles to the angles of the lugs.

5. Folding spectacles or eye glasses comprising a rigid bridge, eye pieces having angularly disposed lugs hinged to said bridge, said eye pieces being operative to lie in alignment one with the other in open position, hinge lugs integral with the bridge and located at the ends thereof, cooperating lugs integral with the first mentioned lugs, horizontal hinge pins connecting the lugs, the hinge pins being disposed at angles to the plane of alignment of the eye pieces, whereby in the folding up operation the eye pieces move edgewise towards each other but sufficiently out of parallelism one with the other to avoid collision.

6. In folding spectacles a fitting comprising a rigid bridge, hinge elements at the ends of the bridge inclined to the plane of alignment thereof, cooperating lugs similarly inclined, lugs integral with said cooperating lugs for attaching said cooperating lugs to the rims of eye pieces, horizontal hinge pins connecting the lugs to provide the hinge movement, the hinge pins being inclined to the plane of alignment of the bridge and at right angles to the hinge lugs.

7. Folding spectacles comprising a rigid bridge, hinge elements integral with the end of the bridge, eye pieces, hinge elements attached to said eye pieces at an angle to said eye pieces for cooperation with the hinge elements of the bridge, and horizontally disposed hinge pins lying at an angle to the line of alignment of the eye pieces connecting said hinge elements.

WILLIAM DAVID EGLINTON.